(12) United States Patent
Collins (10) Patent No.: US 7,685,019 B2
(45) Date of Patent: Mar. 23, 2010

(54) SYSTEM AND METHOD FOR OPTIMIZING THE DELIVERY OF ADVERTISEMENTS

(75) Inventor: Robert J. Collins, Carlsbad, CA (US)

(73) Assignee: Yahoo! Inc., Sunnyvale, CA (US)

( * ) Notice: Subject to any disclaimer, the term of this patent is extended or adjusted under 35 U.S.C. 154(b) by 663 days.

(21) Appl. No.: 11/321,888

(22) Filed: Dec. 28, 2005

(65) Prior Publication Data

US 2007/0027753 A1    Feb. 1, 2007

Related U.S. Application Data

(60) Provisional application No. 60/703,904, filed on Jul. 29, 2005.

(51) Int. Cl.
*G06Q 30/00* (2006.01)
(52) U.S. Cl. .................. 705/14.42; 705/14.41
(58) Field of Classification Search ............. 705/14, 705/14.41, 14.42
See application file for complete search history.

(56) References Cited

U.S. PATENT DOCUMENTS 6,006,197 A * 12/1999 d'Eon et al. .................. 705/10
6,269,361 B1 * 7/2001 Davis et al. .................. 707/3
7,363,302 B2 * 4/2008 Lester ........................... 707/7
7,370,002 B2 * 5/2008 Heckerman et al. ......... 705/10

OTHER PUBLICATIONS

"New Methods and Fast Algorithms for Database Normalization" by Jim Diederich and Jack Milton; ACM Transactions on Database Systems, vol. 13, No. 3, Sep. 1988, pp. 339-365.*

* cited by examiner

*Primary Examiner*—Robert Weinhardt
*Assistant Examiner*—Michael Stibley
(74) *Attorney, Agent, or Firm*—Seth H. Ostrow; Ostrow Kaufman & Frankl LLP (57) ABSTRACT

The present invention relates to systems and methods for the optimized delivery of one or more advertisements from a group of advertisements. The method of the present invention comprises receiving a request for one or more advertisements and retrieving advertisements responsive to the request received. Click through data associated with the one or more advertisements is retrieved and is normalized using a normalization algorithm. The normalized click through data is used to assign weights to the one or more advertisements. Tracking codes are generated for the one or more advertisements to track user interactions with a given advertisement. Advertisements are distributed according to the one or more advertisements' associated weights with associated tracking codes in one or more formats to one or more locations through which advertising may be conducted.

34 Claims, 6 Drawing Sheets

SYSTEM AND METHOD FOR OPTIMIZING THE DELIVERY OF ADVERTISEMENTS

RELATED APPLICATIONS

This application claims priority to U.S. Provisional Patent Application Ser. No. 60/703,904, entitled "SYSTEM AND METHOD ALLOWING INFORMATION PROVIDER ACCESS TO A NETWORKED DATABASE SEARCH SYSTEM," filed on Jul. 29, 2005, the disclosure of which is hereby incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The present invention generally provides methods and systems for facilitating the delivery of advertisements. More specifically, the present invention provides methods and systems that indicate optimal advertisements from among a group of advertisements for display to users.

Advertisements are commonly used on the Internet to promote various products and services. Advertisements may comprise banner ads, links to web pages, images, video, text, etc. The various advertisements used to promote products on the Internet may be displayed according to a variety of formats, such as in conjunction with a ranked result set in response to a query, embedded in a web page, a pop-up, etc. The advertisements displayed to a user of a client device may be selected, redirecting a user to a website providing the product or service advertised.

Client devices, communicatively coupled to a network such as the Internet, are capable of accessing various websites which may display advertisements. For example, a user of a client device may submit a search query comprising one or more terms to a search engine, which causes the search engine to retrieve a result set comprising links to content, as well as advertisements responsive to the search terms provided by a user. The search engine displays the result set that it generates to a user who may then select or view items in the result set, including one or more advertisements.

Advertisements displayed in response to a user's query, embedded within a webpage, displayed as a pop-up, etc., are often retrieved according to a predetermined algorithm. For example, the advertisements presented to a user may be selected according to an algorithm that determines the frequency with which a query term appears in a given web advertisement. Similarly, the advertisements embedded in a web page may be selected based upon the terms appearing in the respective web page. Retrieval and delivery methodologies for advertisements using query term frequency or web page content are tailored to provide users with advertisements based upon each advertisement's relevancy with respect to a query or web page. However, while such retrieval and delivery methods are capable of providing users with results that are relevant links to content, these methods fail to take into account the profit interests and needs of the search engine provider and the advertisers providing the advertisements.

Different advertisements may be more profitable or less profitable for a search engine provider to display as the amount paid by each advertiser for displaying an advertisement varies. Additionally, because a search engine provider may charge an advertiser a fee for each advertisement selected by a user, the frequency with which an advertisement is selected may be a significant factor in selecting which advertisements to display in response to a query, within a web page, as a pop-up, etc. Advertisers may have a plurality of advertisements pertaining to a particular product or service, whereby the advertiser measures the success of an advertisement by examining the number of users who select the advertisement when displayed on client devices. Because users may be more responsive to a particular advertisement among a plurality of advertisements pertaining to a similar product or service, the advertiser may desire to display the most successful advertisements in order to increase the likelihood that users purchase the advertiser's products or services.

One methodology for measuring the effectiveness of an advertisement utilizes "click through rate," which is a measure of the number of users who select a given advertisement. However, because advertisements may be delivered in a ranked result set, at varying times, to different web pages, etc., click through rate fails to adequately measure the success or effectiveness of an advertisement. For example, an advertisement or other item of content ranked and displayed first in a result set or displayed during peak hours of Internet traffic is more likely to be selected by a given user than an item ranked second, third, etc., or displayed during off-peak hours. Therefore, an advertisement ranked first in a result set or appearing during peak hours may often receive the greatest user response, thereby resulting in the greatest click through rate for a group of advertisements. However, simply using click through rate as a measure of effectiveness does not provide a search engine or advertiser with an accurate representation of the success of a given advertisement.

Current methods and systems for selecting advertisements for delivery to users from a plurality of advertisements fail to take into account both the relevancy and effectiveness of those advertisements. In order to overcome shortcomings associated with existing advertisement selection and delivery techniques, embodiments of the present invention provide systems and methods for tracking and normalizing click through rates for one or more advertisements among a plurality of advertisements. Normalized click through rates may be used to assign one or more advertisement weights that allow for the selection and delivery of both relevant and effective advertisements.

SUMMARY OF THE INVENTION

The present invention is directed towards methods and systems for optimizing the delivery of advertisements from among a group of advertisements. According to one embodiment, the method comprises retrieving click through rates associated with one or more advertisements within a group of advertisements. The click through data corresponding to the one or more advertisements is normalized and used to assign weights to the one or more advertisements.

According to one embodiment of the invention, click through rates are normalized according to time. According to another embodiment of the invention, click through rates are normalized according to user characteristics as specified in a user profile. According to an alternative embodiment, click through rates are normalized according to demographic information. Those of skill in the art recognize that other normalization techniques may be applied and are contemplated as falling within the scope of the present invention.

Normalized click through rates of the one or more advertisements within the group of advertisements may be compared to assign weights to the one or more advertisements. According to one embodiment of the invention, the comparison of normalized click through rates and assignment of weights to the one or more advertisements is selected based upon the quantity of advertisements in the group of advertisements. According to another embodiment of the invention, the comparison of normalized click through rates and assignment of weights to the one or more advertisements is selected based upon the quantity or quality of click through data corresponding to the one or more advertisements in the group of advertisements.

According to one embodiment of the invention, the method assigns equal weights to the one or more advertisements within the group of advertisements and calculates an average normalized click through rate for the one or more advertisements within the group of advertisements. The normalized click through rate of a selected advertisement is compared with the average normalized click through rate of the one or more advertisements comprising the group of advertisements. The selected advertisement's weight may be decreased or increased based upon the comparison with the average normalized click through rate.

According to another embodiment of the invention, the method comprises calculating the average normalized click through rate for the one or more advertisements comprising the group of advertisements. The normalized click through rate of a selected advertisement is compared with the average normalized click through rate of the one or more advertisements comprising the group of advertisements. If the selected advertisement's click through rate does not exceed the average normalized click through rate, the advertisement is assigned a weight of zero or otherwise marked for non-delivery.

According to yet another embodiment of the invention, a first and a second advertisement are selected from the one or more advertisements comprising the group of advertisements. A comparison is made between the first advertisement's normalized click thorough rate and the second advertisement's normalized click through rate. The advertisement with the lesser of the two normalized click through rates is assigned a weight of zero or otherwise marked for non-delivery.

Tracking codes may be generated for the one or more advertisements within the group of advertisements to track user interactions with a given advertisement. The tracking codes may be used to deliver data about user interactions with a given advertisement to an analytics data store.

According to one embodiment of the invention, advertisements with the greatest associated weights may be distributed to one or more locations in one or more formats. According to another embodiment of the invention, the weights associated with advertisements may be used to bias a random choice between two advertisements from a given advertiser for distribution to one or more locations in one or more formats. Advertisements may be distributed to one or more websites, which may include distributing the advertisements as pop-up advertisements, as banner advertisements, etc. Advertisements may also be distributed by a search engine in response to a user search query.

The invention is also directed towards a system for optimizing the delivery of advertisements. According to one embodiment, the system of the present invention comprises a content data store, operative to store one or more advertisements as one or more groups of advertisements. The system further comprises an analytics data store, operative to store click through rates associated with the one or more advertisements. The analytics data store may maintain data about user interactions with one or more advertisements in the content data store.

A weight optimizer is operative to normalize the click through data stored in the analytics data store. The weight optimizer is further operative to select an algorithm to assign weights to the one or more advertisements based upon the advertisements' associated normalized click through rates. According to one embodiment of the invention, the weight optimizer is operative to select an algorithm to assign weights based upon the quantity of advertisements within the group of advertisements. According to another embodiment of the invention, the weight optimizer is operative to select an algorithm to assign weights based upon the quantity or quality of click through data associated with the one or more advertisements within the group of advertisements.

The system of the present invention also comprises a search-serving component operative to receive one or more requests for advertisements. According to one embodiment of the invention, the search-serving component generates tracking codes associated with the one or more advertisements within the group of advertisements. The tracking codes associated with a given advertisement provide information about user interactions with a given advertisement to the analytics data store. According to one embodiment of the invention, the search-serving component is operative to traverse the group of advertisements and select advertisements with the greatest associated weight for delivery to web pages, client devices, as banner advertisements, as pop-up advertisements, etc. According to another embodiment of the invention, the search-serving component is operative to utilize the weights associated with the advertisements to bias a random choice between two or more advertisements from a given advertiser for delivery to web pages, client devices, as banner advertisements, as pop-up advertisements, etc.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENT

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
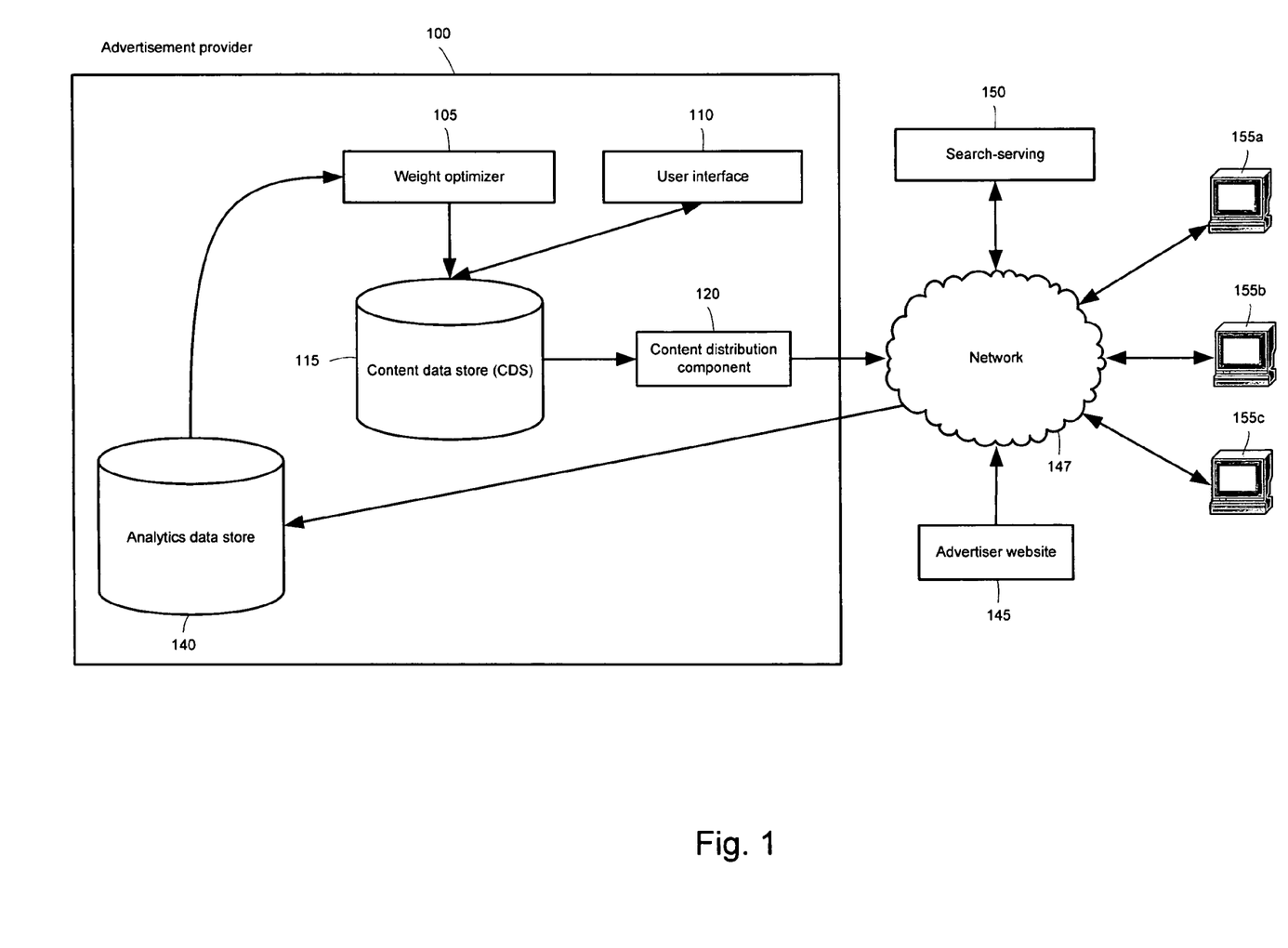
FIG. 1 is a block diagram presenting a system for optimizing the selection of advertisements to be delivered to client devices according to one embodiment of the invention.

FIG. 1 presents a block diagram depicting one embodiment of a system for optimizing the selection of advertisements for delivery to client devices. According to the embodiment of FIG. 1, client devices 155a, 155b and 155c are communicatively coupled to a network 147, which may include a connection to one or more local and/or wide area networks, such as the Internet. According to one embodiment of the invention, a client device 155a, 155b and 155c is a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

Client devices 155a, 155b and 155c communicatively coupled to a network 147 may transmit search requests and receive a plurality of advertisements in response to the respective requests. Similarly, client devices may access web sites with embedded advertisements, receive advertisements as pop-up ads, etc. The advertisements displayed to client devices 155a, 155b and 155c are stored and retrieved from a content data store 115. The content data store 115 is operative to maintain one or more advertisements and may comprise one or more accessible memory structures such as a database, CD-ROM, tape, digital storage library, etc. The content data store may be implemented as a database or any other type of storage structure capable of providing for the retrieval and storage of a variety of data types. The content data store may store a variety of advertisement data types including websites, text, video, images, banners, links, etc. Advertisements at the content data store 115 may be maintained in groups according to advertiser, product, category, or a combination thereof. According to one embodiment, advertisements are stored in the content data store 115 in groups according to a given product or service offered by a given advertiser. According to another embodiment of the invention, advertisements are stored in the content data store in groups according to the time of the day the advertisements are distributed. Those of skill in the art recognize other methods for storing one or more advertisements in one or more groups.

Advertisers may access the content data store 115 through the use of the user interface 110 the advertisement distributor 100 makes available. The user interface 110 provides an advertiser with the ability to view existing advertisements in the content data store 115, add new advertisements to the content data store 115, modify existing advertisements in the content data store 115, remove advertisements from the content data store 115, create new groups of advertisements within the data store 115, etc. The user interface 110 may further be used to define advertiser preferences with respect to advertisement groups. For example, an advertiser may specify a classification for a given advertisement or may define threshold values used in determining the frequency with which to distribute an advertisement. The user interface 110 may be a graphical user interface, a command line interface or other interface known to those of skill in the art.

The content distribution component 120 is in communication with the content data store 115 and retrieves advertisements for delivery to the search-serving component 150 via the network 147. The content distribution component may retrieve and deliver advertisements in response to requests from client devices 155a, 155b and 155c or the search-serving component 150. The content distribution component 120 may also retrieve and deliver advertisements in response to modifications to advertisements contained in the content data store 115. For example, an advertiser may replace or update one or more advertisements contained in the content data store 115. The changes made to the advertisements in the content data store 115 are automatically propagated to the search-serving component 150 via the content distribution component 120.

The search-serving component 150, communicatively coupled to the network 147, receives advertisements from the advertisement provider 100 and generates tracking codes for the advertisements received, thereby allowing the advertisement provider 100 to track user interactions with advertisements. Alternatively, tracking codes may be generated by the content distribution component 120. According to one embodiment of the invention, tracking codes are placed in the destination URL for the one or more advertisements received by the search-serving component 150. According to another embodiment of the invention, the search-serving component generates tracking codes associated with serving a given advertisement and the selection of an advertisement by a user of a client device 155a, 155b and 155c. According to yet another embodiment of the invention, tracking codes may be specified for each respective advertisement maintained in the content data store 115. When advertisements are received by the search-serving component 150, the search-serving component 150 may attach the appropriate tracking codes depending on which advertisements are actually served.

The search-serving component 150 distributes the advertisements to web sites being accessed or viewed by client devices 155a, 155b and 155c communicatively coupled to the network 147. The search-serving component may select one or more advertisements to be displayed on a client device 155a, 155b and 155c based upon the context of a request. For example, the search-serving component may serve one or more advertisements in response to a search query submitted to a search engine. Similarly, the search-serving component may serve one or more advertisements to one or more affiliate web pages based upon, for example, the context of the affiliate web page. According to one embodiment of the invention, tracking codes associated with the delivery of an advertisement provide information to the analytics data store 140 indicating delivery of a given advertisement.

The advertisements sent to a given client device 155a, 155b and 155c by the search-serving component 150 may be selected by a user of a client device 155a, 155b and 155c. According to one embodiment of the invention, the selection of an advertisement by a user of a client device 155a, 155b and 155c is reported to the analytics data store 140 using the tracking codes associated with a given advertisement. When a user selects an advertisement distributed by the search-serving component 150, the user is redirected to the respective advertiser's website 145. In addition to tags in advertisements, an advertiser's website may contain tags providing information on the web site being accessed. For example, tags contained within an advertiser's one or more web pages may indicate whether the web page is associated with purchasing, browsing, etc. The information provided by the tags contained in an advertiser's one or more web pages may be used by the tracking codes associated with a given advertisement to deliver data to the analytics data store 140. The information associated with an advertiser's web site and delivered to the analytics data store 140 may comprise the advertisement selected, the time of day, the month, information stored in a user profile, the ranking of the advertisement in ranked result set, etc.

The analytics data store 140 is an accessible memory structure such as a database, CD-ROM, tape, digital storage library, etc. The analytics data store 140 maintains information regarding user interactions with advertisements and may be implemented as a database or any other type of data storage structure capable of providing for the retrieval and storage of a variety of data types. The analytics data store 140 may store a variety of data types related to advertisements. Advertisement information in the analytics data store 140 may be maintained in groups according to advertiser, product, category, or a combination thereof. Advertisement information in the analytics data store 140 may also be maintained according to advertiser specified groups.

The analytics data store 140 is periodically populated with data indicating user interactions with advertisements, which may also include interactions with an advertiser web site 145. The analytics data store 140 receives advertisement data associated with a given advertisement and determines whether an existing record exists for the advertisement data received. If the analytics data store 140 locates a record, the analytics data store 140 updates the existing record to indicate further user interactions with a given advertisement or advertiser web site 145. For example, if the analytics data store 140 receives information indicating that a user of a client device 155a, 155b and 155c selected a given advertisement, the analytics data store 140 determines whether a record exists for the given advertisement. If a record exists, the record is updated to indicate that an additional user selected the given advertisement. If a record does not exist corresponding to the information received, a new entry is created in the analytics data store 140 for the given advertisement's information. According to one embodiment of the invention, a record in the analytics data store 140 may also store information regarding user characteristics specified in a user profile. For example, if a user selects a given advertisement, information stored in a user profile, including but not limited to demographic information, age, sex, etc., may be delivered and stored in the analytics data store 140. Alternatively, an existing user profile may be updated.

The weight optimizer 105 utilizes the information stored in the analytics data store 140 to normalize click through rates and assign weights to advertisements within a group of advertisements in order to optimize the selection of advertisements from the group for distribution. The weight optimizer 105 retrieves data for a group of advertisements from the analytics data store 140. According to one embodiment of the invention, a group of advertisements comprises one or more advertisements provided by an advertiser to advertise a similar product or service. According to another embodiment of the invention, a group of advertisements comprises one or more advertisements provided by a single advertiser and displayed during a particular time of day. According to yet another embodiment of the invention, a group of advertisements comprises one or more advertisements provided by a single advertiser and displayed to users having similar characteristics as specified in user profiles. Those of skill in the art recognize other groupings for one or more advertisements fall within the scope of the present invention.

The weight optimizer 105 determines a proper algorithm to use in assigning weights to the one or more advertisements within a group of advertisements. According to one embodiment of the invention, the weight optimizer 105 selects an algorithm based upon the quantity of advertisements in a given group of advertisements. The weight optimizer 105 assigns an initial weight to advertisements by normalizing the click through rate for advertisements in a group and assigning a given advertisement a weight based upon the normalized click through rate. As additional data is gathered by the analytics data store for the one or more advertisements comprising a group of advertisements, the weight optimizer modifies the weight associated with a given advertisement. According to one embodiment of the invention, the weight optimizer 105 decreases or increases the weight associated with a given advertisement, or marks an advertisement for non-delivery, based upon a comparison between a given advertisement's normalized click through rate and the average normalized click through rate for advertisements in the group.

According to another embodiment of the invention, the weight optimizer 105 decreases or increases the weight associated with a given advertisement, or marks an advertisement for non-delivery, based upon a comparison between advertisements in the group. According to yet another embodiment of the invention, the weight optimizer 105 decreases or increases the weight associated with a given advertisement based upon a comparison with the average normalized click through rate of advertisements in a group. An average normalized click through rate is calculated for the one or more advertisements comprising a group of advertisements. An advertisement is selected and a comparison is made between the selected advertisement's normalized click through rate and the average normalized click through rate of the one or more advertisements comprising the group of advertisements. If the average normalized click through rate of the one or more advertisements comprising the group of advertisements exceeds the selected advertisement's normalized click through rate with statistical significance, the selected advertisement is marked for non-delivery.

The weight optimizer 105 may be configured to periodically calculate weights for advertisements stored in the content data store 115. For example, the weight optimizer 105 may be configured to assign weights to advertisements once every 24 hours, once a week, etc. Furthermore, the weight optimizer 105 may be configured to execute a normalization and weight assignment algorithm until the weight optimizer has determined the N most effective advertisements, where N may be a predetermined threshold or defined by an advertiser using the user interface 110 of the advertisement provider 100. Additionally, the weight optimizer 105 may be configured to execute a normalization and weight assignment algorithm upon receipt of new advertisements from an advertiser or upon detecting the removal of an advertisement by an advertiser.

The weights assigned to the one or more advertisements in a group of advertisements by the weight optimizer 105 are stored in the content data store 115 with corresponding advertisements. The search-serving component 150 utilizes the weights associated with one or more advertisements in a given group of advertisements to determine which advertisements to distribute in response to a request. When requests are received by the advertisement provider 100, the content distribution component 120 retrieves one or more groups of advertisements from the content data store 115 in response to the request. The content distribution component delivers the advertisements to the search-serving component 150. The search-serving component 150 may analyze the weights of the one or more advertisements in the one or more groups of advertisements delivered from the content distribution component 120. According to one embodiment of the invention, the search-serving component 150 selects the advertisements with the greatest weights to display to users of client devices 155a, 155b and 155c. Therefore, users of client devices 155a, 155b and 155c receive advertisements from a group comprised of one or more advertisements that have the greatest weights, increasing the likelihood that a given advertisement is selected. According to another embodiment of the invention, the weights associated with the one or more advertisements in the one or more groups of advertisements are utilized by the search-serving component 150 to bias a random choice between two or more advertisements from a given advertiser. For example, the content distribution component 120 may identify a plurality of advertisements from a given advertiser response to a given request. The search-serving component 150 may be configured to select only one advertisement from a given advertiser in response to a given request. Therefore, the search-serving component 150 may utilize the weights associated with the advertisements delivered from the content distribution component 120 to bias a random choice between two or more advertisements from a given advertiser response to a given request. For example, the content distribution component 120 may deliver advertisements A and advertisement B from a given advertiser in response to a given request. The search-serving component 150 may determine that advertisement A has an associated weight of 0.75 and advertisement B has an associated weight of 0.25. The search-serving component 150 may generate a random number between zero (0) and one (1). If the random number generated is less than or equal to 0.75 (the weight associated with advertisement A), advertisement A will be selected by the search-serving component 150. Similarly, if the random number generated is greater than 0.75, advertisement B will be selected by the search-serving component 150.

Figure 2:
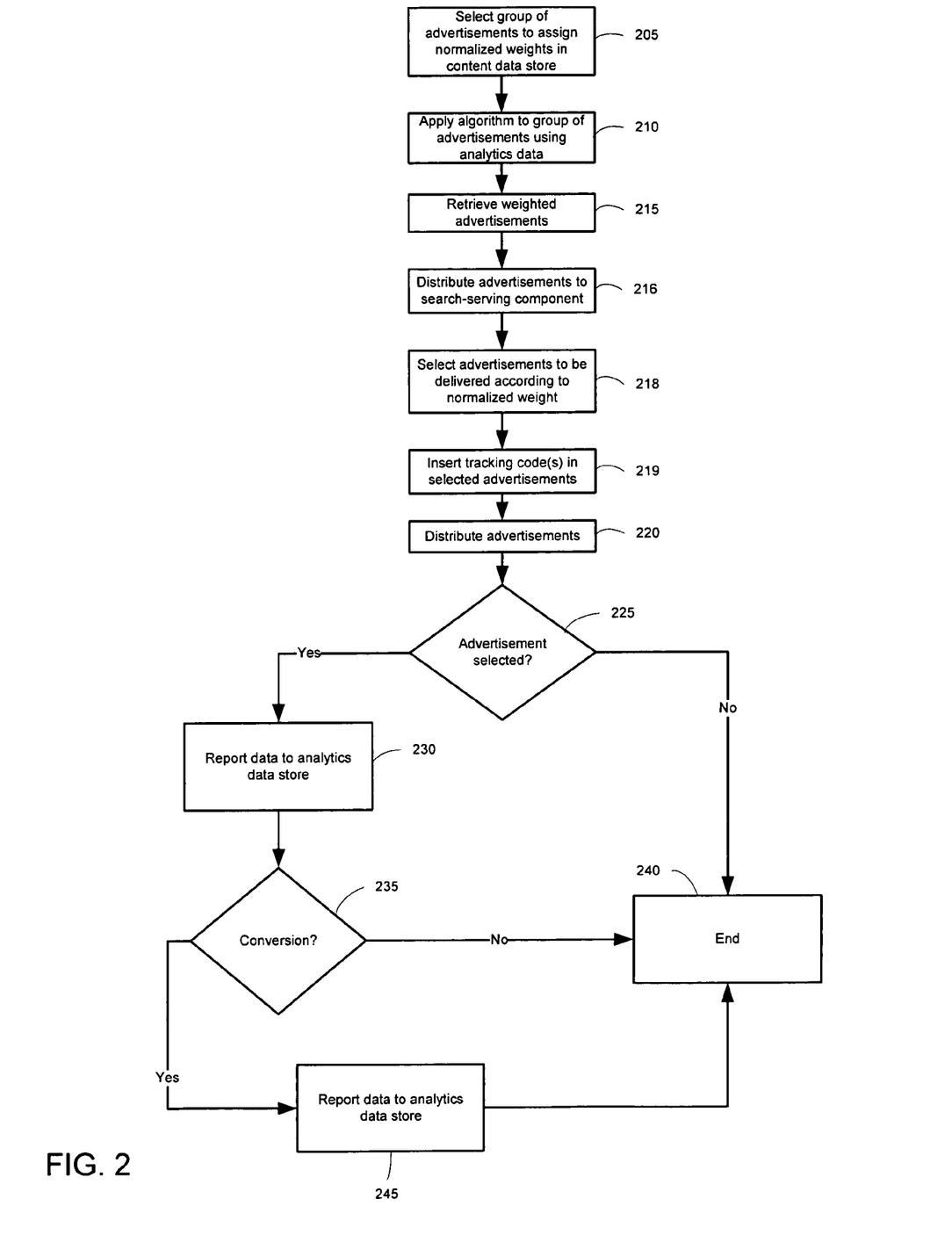
FIG. 2 is a flow diagram presenting a method for optimizing the selection of advertisements to be delivered from among a group of advertisements according to one embodiment of the invention.

FIG. 2 presents a flow diagram illustrating one embodiment of a method for optimizing the selection of one or more advertisements from among a group of advertisements to be delivered and tracking user interactions with the one or more advertisements. A group of advertisements is selected for delivery optimization from the one or more groups of advertisements stored in a content data store, step 205. According to one embodiment of the invention, a group of advertisements comprises one or more advertisements from a given advertiser directed towards advertising a similar product or service. According to yet another embodiment of the invention, a group of advertisements comprises one or more advertisements to be displayed to a user in response to a certain query. According to yet another embodiment of the invention, a group of advertisements comprises one or more advertisements to be displayed to users with certain characteristics as specified in user profiles. According to yet another embodiment of the invention, a group of advertisements comprises on or more advertisements to be included in a group as specified by a given advertiser.

Analytics data corresponding to the one or more advertisements comprising a group of advertisements is retrieved from an analytics data store, step 208. The analytics data may comprise information indicating the number of times a given advertisement was selected by users when displayed in a certain position within a ranked list of advertisements, the time of day an advertisement was displayed, characteristics of a user who selected the advertisement (which may be specified in a user profile), etc. The analytics data corresponding to the one or more advertisements is used to generate normalized click through rates for the one or more advertisements comprising the group of advertisements. For example, a group of advertisements from a given advertiser may comprise one or more advertisements all directed at advertising "wireless routers." The analytics data store may contain information indicating the number of times each advertisement in the "wireless router" advertisement group was selected.

According to one embodiment, a weight optimizer is used to normalize the click through rates of the one or more advertisements comprising a group of advertisements and assign weights to advertisements using the data retrieved from the analytics data store. The process of assigning one or more advertisements a weight may be performed using a normalizing algorithm, an empirical body of data, and the data retrieved from the analytics data store, step 210. According to one embodiment of the invention, the normalizing algorithm selected to assign weights to the one or more advertisements comprising a group of advertisements is based upon the quantity of advertisements in the group. For example, a threshold value corresponding to the number of advertisements in a group may be used to select the appropriate normalizing algorithm.

The weights assigned to the one or more advertisements comprising a group of advertisements are stored in the content data store. When a request is received for advertisements, a group of advertisements and associated weights is retrieved from the content data store in response to the request, step 215. The content distribution component delivers the group of advertisements to a search-serving component, step 216. The search-serving component examines the one or more advertisements comprising a group of advertisements and the weights associated with the one or more advertisements. The search-serving component utilizes the weights associated with the one or more advertisements comprising a group of advertisements to determine which advertisements to distribute, step 218. According to one embodiment of the invention, the search-serving component selects advertisements that have an associated weight above a predetermined threshold. According to another embodiment of the invention, the search-serving component selects advertisements having an associated weight above a threshold defined by a given advertiser. According to yet another embodiment of the invention, the search-serving component selects the N advertisements with the greatest weight. According to a further embodiment of the invention, the search-serving component utilizes the weights to bias a random choice between two or more advertisements from a given advertiser.

The search-serving component generates tracking codes associated with the one or more advertisements selected for distribution, step 219. The one or more advertisements are distributed with tracking codes that the system uses to monitor user interactions, step 220. For example, advertisements distributed by the search-serving component may be viewed and selected by users of client devices. The tracking codes associated and delivered with an advertisement are used to record selection of an advertisement by a user, step 230.

According to the embodiment illustrated by FIG. 2, if an advertisement is not selected, no information is collected for the advertisement distributed, step 240. According to another embodiment of the invention, if an advertisement is not selected, information indicating that the advertisement was distributed and not selected may be collected. Alternatively, if an advertisement is selected, a user is redirected to the advertiser's web site associated with the advertisement selected. Pages comprising the web site associated with the selected advertisement may contain tags that comprise one or more pieces of data that may be retrieved and delivered to the analytics data store. For example, tags in a given advertiser's web site may comprise data identifying the type of page, such as whether a page is associated with purchasing, shopping, etc. The tags may further provide timestamp information to indicate when an advertisement was selected.

The information specified by the tags within the pages comprising a given advertiser's web site that a user accesses may be delivered to the analytics data store. An advertiser may also include tags in any of the one or more web pages comprising the advertiser's web site. For example, an advertiser may insert tags in the web pages associated with purchasing the advertiser's products or services. When the web page associated with purchasing is accessed, the tags within the purchasing web page provide information specifying that a purchasing web page of a given advertiser's web site was accessed. A check may be performed to determine whether a user accessing an advertiser's web page made a purchase, step 235. If a purchase was made, the information contained within the tags inserted in the purchasing web page are delivered to the analytics data store, step 245. Furthermore, the tracking codes associated with a given advertisement may be used to identify the advertisement that resulted in the user's purchase.

According to the embodiment illustrated by FIG. 2, if a user does not make a purchase, no information is retrieved or delivered, step 240. According to another embodiment of the invention, if a user did not make a purchase but accessed a purchasing web page, such information may be delivered to the analytics data store. It should be noted that the while the presently illustrated method describes tagging a final web page in a purchase process, an advertiser may insert tags on any page significant to the advertiser in the purchasing process. For example, an advertiser may insert tags in web pages where a user browses models of a certain product, or web pages that prompt a user to enter user information, such as city, state, sex, age, etc.

Figure 3:
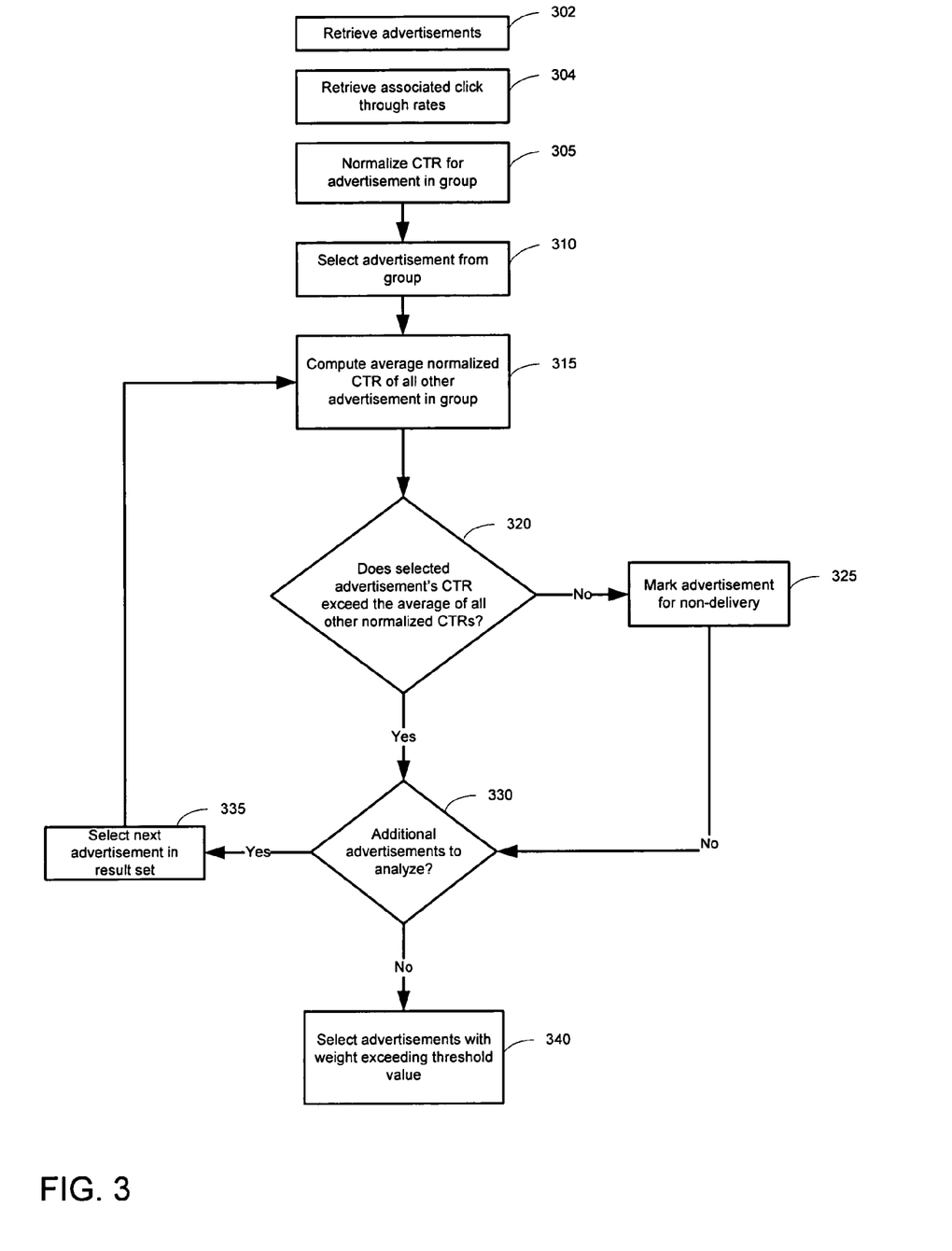
FIG. 3 is a flow diagram presenting a method for selecting an optimal advertisement from among a group of advertisements using a comparison between the normalized click through rate of a selected advertisement and the average normalized click through of a group of advertisements according to one embodiment of the invention.

FIG. 3 presents a flow diagram illustrating one embodiment of a method for optimizing the delivery of one or more advertisements within a group of advertisements. A group of advertisements is retrieved in response to a query or other request for advertisements, step 302. Additionally, click-through-rates associated with the one or more advertisements comprising the group of advertisements are retrieved, step 304. The click through rates corresponding to the one or more advertisements within the group are normalized using the retrieved click through data and empirical data corresponding to a selected normalization algorithm, step 305. The normalized clicks through rates are used to assign weights to the one or more advertisements within the group.

According to one embodiment of the invention, the normalization process of step 305 is performed to normalize differences in click through rates due to advertisements appearing in different positions within a ranked result set. As previously noted, advertisements appearing first in a ranked result set are more likely to be selected by a user than advertisements appearing second, third, etc. Therefore, an advertisement appearing first in a ranked result set may have a significantly greater click through rate than an advertisement appearing second, third, etc. A normalization of the click through rates, using empirical data, compensates for the difference in rank positions of the one or more items comprising a group of advertisements. The empirical body of data used by the selected normalization algorithm may provide information specifying the likelihood of an advertisement being selected by a user when displayed in position one, two, three, etc., of a ranked group of advertisements.

According to another embodiment of the invention, the normalization process of step 305 is performed to normalize differences in click through rates due to advertisements appearing at different times of the day, different days of the week, etc. For example, advertisements appearing at 9:00 a.m. or 7:00 p.m. may receive a greater click through rate than advertisements appearing at 4:30 a.m. or 11:00 p.m. Advertisements appearing during different time periods are normalized according to time to compare the effectiveness of one or more advertisements in a given group of advertisements. According to yet another embodiment of the invention, the normalization process of step 305 is performed for multiple factors. For example, normalization may be performed for click through rates associated with a certain time of day in conjunction with click through rates associated with certain user characteristics as specified in a user profile. Those of skill in the art recognize other methods for which normalization may be necessary to ascertain the effectiveness of one or more advertisements within a group of advertisements.

Table A presents equations illustrating one embodiment for computing the normalized click-through rate for a given advertisement:

TABLE A $$I_N = \sum_{a,b} I_{a,b}$$

$$C_N = \sum_{a,b} \frac{C_{a,b}}{CTR_{p_a} \times CTR_{t_b}}$$

$$CTR_N = \frac{C_N}{I_N}$$

According to the equation presented in Table A, a is the position a given advertisement was displayed or clicked, b is the hour-of-week the given advertisement was displayed or clicked, $CTR_p$ is a position-based factor that indicates the relative likelihood of an advertisement being clicked in a particular position. $CTR_t$ is a time-based factor that indicates the relative likelihood of an advertisement being clicked at a particular time. $I_{a,b}$ is the number of times the given advertisement was displayed in position a in hour b, $C_{a,b}$ is the number of clicks the given advertisement received in position a in hour b, $I_N$ is the normalized number of times the given advertisement was displayed, $C_N$ is the normalized number of clicks for the given advertisement, and $CTR_N$ is the normalized click-through rate for the given advertisement.

The normalization equation presented in Table A, or any other appropriate normalization technique, is executed for the one or more advertisements within a group of advertisements to assign the one or more advertisements associated weights. The group of advertisements is traversed, and an advertisement is selected from among the group, 310. The normalized click through rates associated with the remaining one or more advertisements within the group of advertisements are used to calculate an average normalized click through rate, step 315. The normalized click through rate associated with the selected advertisement is compared against the average normalized click through rate of the one or more advertisements comprising the group, step 320. If the selected advertisement's normalized click through rate does not exceed the average normalized click through rate for the group of advertisements, the selected advertisement is assigned a weight of zero or otherwise marked for non-delivery, step 325. If the selected advertisement's normalized click through rate exceeds the average normalized click through rate of the remaining one or more advertisements comprising the group of advertisements, step 320, the advertisement's weight remains unchanged.

A check is performed to determine whether there are additional advertisements among the group to analyze, step 330. If additional advertisements need to be analyzed, step 330, a subsequent advertisement is selected from the one or more advertisements comprising the group, step 335. According to the embodiment illustrated by FIG. 3, after analyzing advertisements in the group, advertisements exceeding a threshold value are selected for delivery to client devices or a distribution component, step 340. According to another embodiment of the invention, the one or more advertisements within the group may be stored with associated weights in a content data store.

Figure 4:
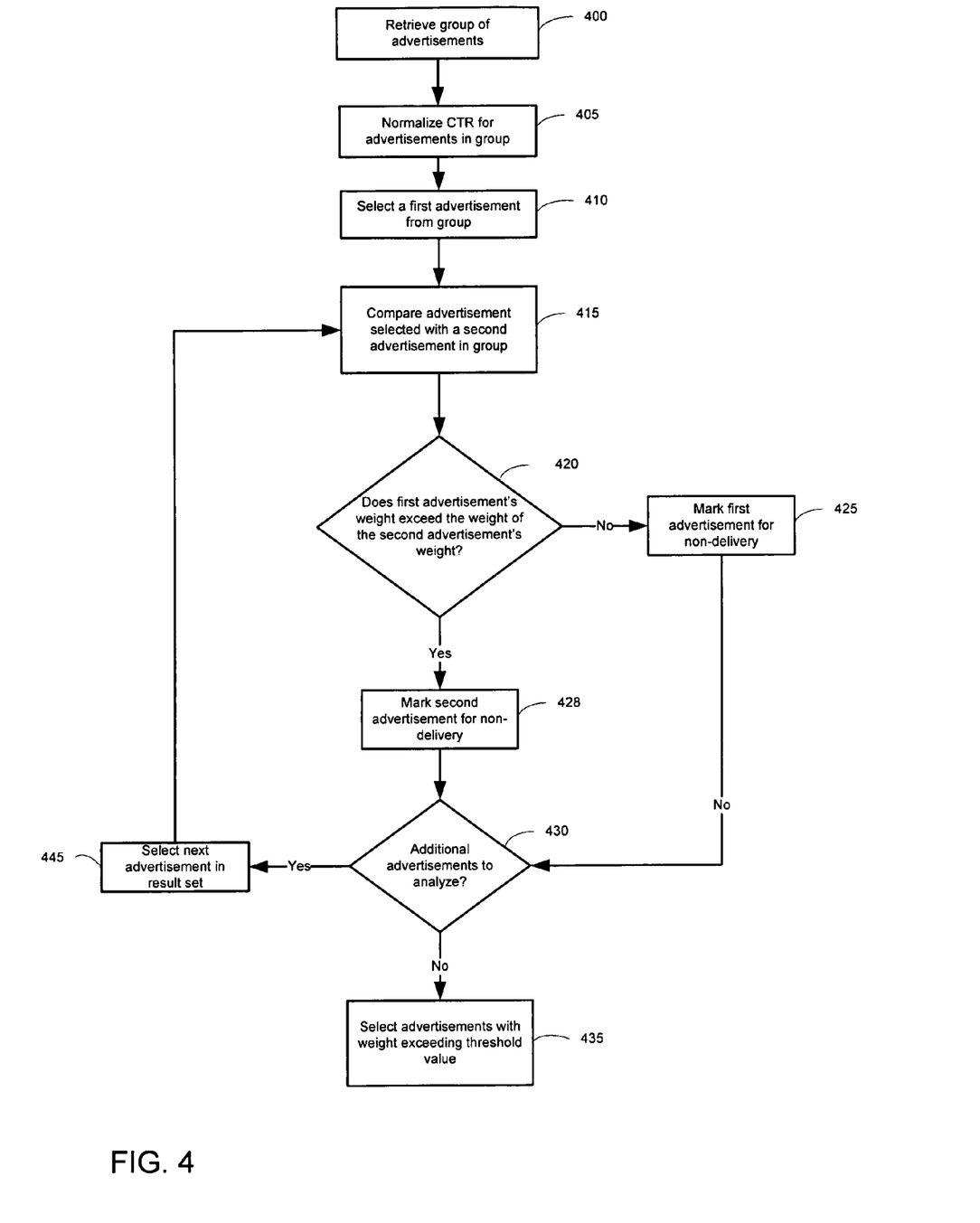
FIG. 4 is a flow diagram presenting an alternative method for selecting an optimal advertisement from among a group of advertisement using an iterative comparison of normalized click through rates between a first and second advertisement according to one embodiment of the invention.

FIG. 4 presents a flow diagram illustrating another embodiment of a method for optimizing the delivery of one or more advertisements from a group of advertisements. A group of advertisements is retrieved in response to a query or other request for advertisements, step 400. Additionally, click-through-rates associated with the one or more advertisements comprising the group of advertisements are retrieved. The click through rates corresponding to the one or more advertisements within a group are normalized using empirical data corresponding to a selected normalization algorithm and the retrieved click through data, step 405. The normalized click through rates may be used to assign weights to the one or more advertisements within the group. According to one embodiment of the invention, the normalization process of step 405 is performed to normalize differences in click through rates due to advertisements appearing in different positions within a ranked result set. According to another embodiment of the invention, the normalization process of step 405 is performed to normalize differences in click through rates due to advertisements appearing at different times of the day, different days of the week, etc. According to yet another embodiment of the invention, the normalization process of step 405 is performed to normalize differences in click through rates due to a plurality of factors. The equations illustrated in Table A provide one embodiment of an equation that may be used to normalize click through rates.

A first advertisement is selected from the one or more advertisements within the group, step 410. The normalized click through rate of the advertisement selected is compared against the normalized click through rate of a second advertisement selected from the one or more advertisements within the group, step 415. According to the embodiment illustrated in FIG. 4, a check is performed to determine whether the normalized click through rate of the first advertisement selected exceeds the normalized click through rate of the second advertisement, step 420. If the normalized click through rate of the first advertisement does not exceed the normalized click through rate of the second advertisement, the first advertisement is assigned a weight of zero or otherwise marked for non-delivery, step 425. Alternatively, if the normalized click through rate of the first advertisement exceeds the normalized click through rate of the second advertisement, the second advertisement is assigned a weight of zero or otherwise marked for non-delivery, step 428. If there are additional advertisements to analyze in the group, step 430, a subsequent advertisement is selected for comparison, step 445. Advertisements in the group are analyzed, step 430, and advertisements exceeding a normalized click through rate threshold are selected for delivery to a client device or a distribution component, step 435. According to another embodiment of the invention, advertisements and associated weights are stored in a content data store.

Figure 5:
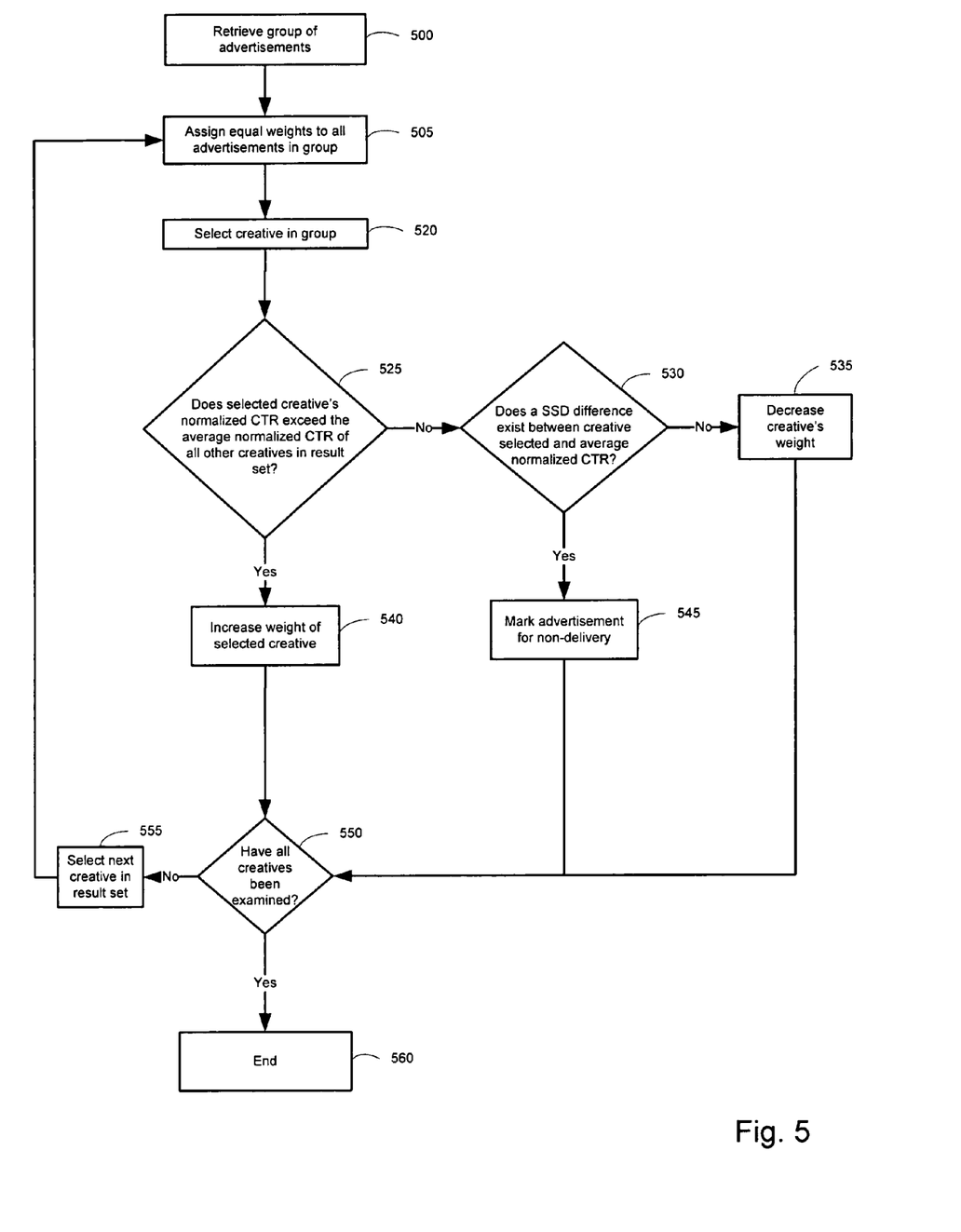
FIG. 5 if a flow diagram presenting an alternative method for selecting an optimal advertisement from among a group of advertisements using a comparison between the normalized click through rate of a selected advertisement and the average normalized click through rate of a group of advertisements according to one embodiment of the invention.

FIG. 5 presents a flow diagram illustrating an alternative method for optimizing the delivery of one or more advertisements within a group of advertisements. A group of advertisements is selected from a content data store for analysis, step 500. The one or more advertisements comprising the group are assigned equal weights, step 505. According to one embodiment of the invention, the sum of the weights assigned to the one or more advertisements comprising a group is equal to one ("1"). An advertisement is selected from among the one or more advertisements comprising the group, step 520. The advertisement's associated normalized click through rate is compared with the average normalized click through rate of all other advertisements comprising the group, step 525. If the selected advertisement's normalized click through rate exceeds the average normalized click through rate of all other advertisement's comprising the group, the weight associated with the selected advertisement is increased, step 540. According to one embodiment of the invention, the weight is increased one percent.

If the selected advertisement's normalized click through rate does not exceed the average normalized click through rate of the one or more advertisements comprising the group, step 525, a check is performed to determine whether a statistically significant difference exists between the selected advertisement's normalized click through rate and the average normalized click through rate of the one or more advertisements within the group, step 530. According to one embodiment of the invention, a chi square test for statistical significance is used to determine whether a statistically significant difference exists between the selected advertisement's normalized click through rate and the average normalized click through rate of the group. If a statistically significant difference is found, the selected advertisement is given a weight of zero or otherwise marked for non-delivery, step 545. If a statistically significant difference is not found, the selected advertisement's weight is decreased, step 535. According to one embodiment of the invention, the weight of the selected advertisement is decreased one percent. A check is performed to determine whether additional advertisements within the group of advertisements require analysis, step 550. Advertisements are selected and analyzed, step 555, until advertisements comprising the group have been analyzed, step 560.

Figure 6:
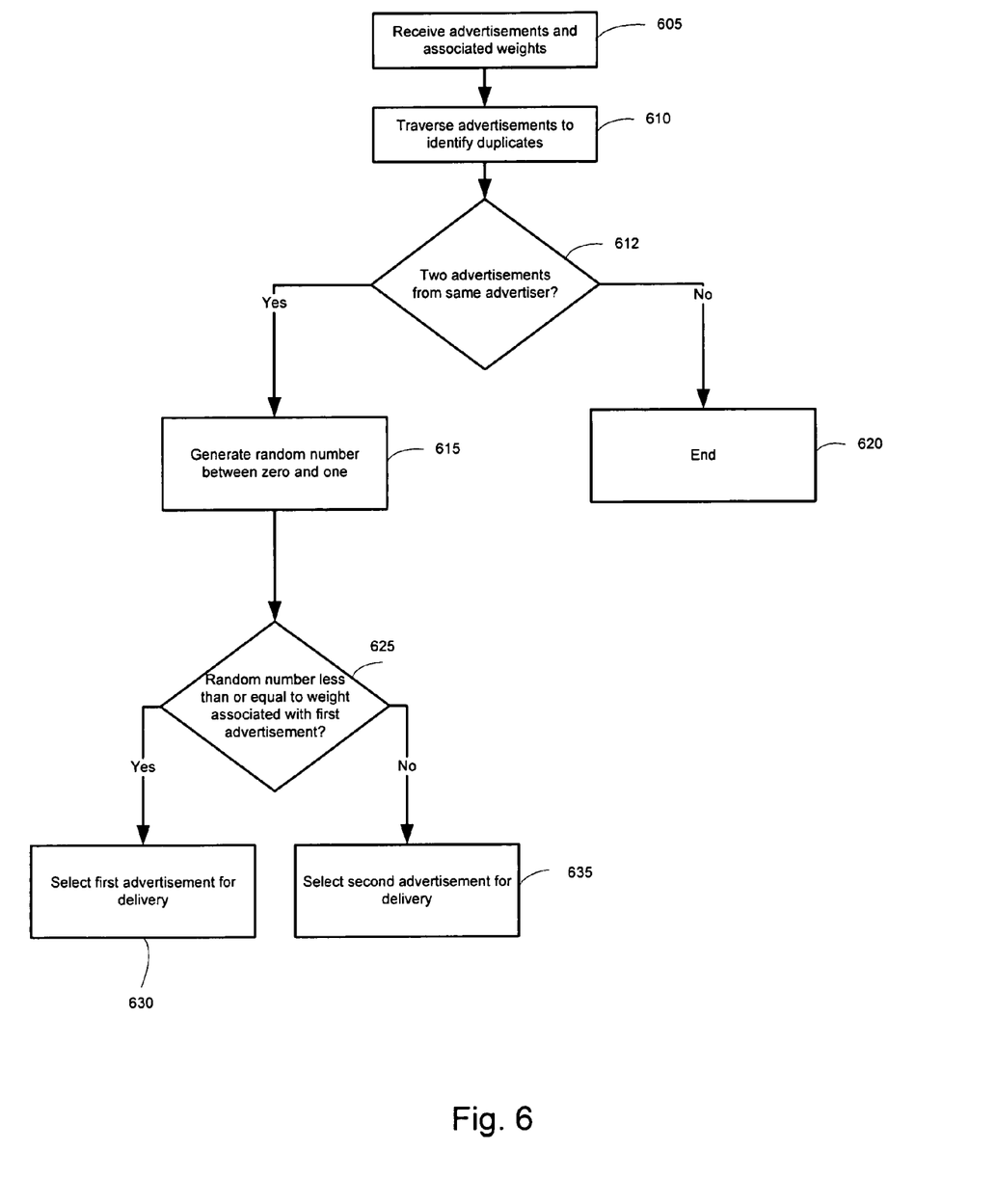
FIG. 6 is a flow diagram illustrating one embodiment of a method for randomly selecting an advertisement from among two or more advertisements from a given advertiser responsive to a given request.

The weights associated with the one or more advertisements comprising a group of advertisements may be utilized by a serving component to bias a random choice between two or more advertisements from a given advertisement in response to a given request. The search-serving component of the system illustrated in FIG. 1 may be configured to distribute only one advertisement from a given advertiser's one or more advertisements responsive to a given request. FIG. 6 illustrates one embodiment of a method for randomly selecting an advertisement from among two or more advertisements from a given advertiser responsive to a given request utilizing the weights associated with each respective advertisement. The search-serving component receives the advertisements comprising a group of advertisements, as well as each respective advertisement's associated weight, step 605. The search-serving component traverses the plurality of advertisements comprising the group of advertisements to identify two or more advertisements from a given advertiser responsive to a given request, step 610. A check is performed to determine whether two or more advertisements from a given advertiser are in the group of advertisements, step 612. If two or more advertisements from the same advertiser are not found, processing ends, step 620. When two or more advertisements from the same advertiser are found within the group of advertisements, the search-serving component generates a random number between zero and one, step 615. The random number generated may be utilized to select from among the two or more advertisements from a given advertiser responsive to a given request. According to one embodiment of the invention, the random number generated is compared with the weights associated with the two or more advertisements from a given advertiser. A check is performed to determine whether the random number generated is less than or equal to the weight associated with a first advertisement from a given advertiser's two or more advertisements in the group of advertisements, step 625. If the check evaluates to true, and the random number generated is less than or equal to the weight associated with the first advertisement, the first advertisement is selected for delivery, step 630. If the check evaluates to false, and the random number is greater than the weight associated with the first advertisement, the second advertisement is selected for delivery, step 635.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

I claim:

1. A method for selecting advertisements for delivery, the method comprising:
   electronically retrieving one or more click through rates associated with one or more advertisements within a group of advertisements wherein the click through rates are retrieved from a computer readable medium;
   selecting a normalizing algorithm from a plurality of normalizing algorithms based on a threshold value, the threshold value comprising a number of advertisements in the group of advertisements;
   electronically normalizing, by a processing device, the click through rates associated with the one or more advertisements within the group of advertisements using the selected normalizing algorithm based on the threshold value;
   electronically assigning, by the processing device, weights to the one or more advertisements within the group of advertisements based upon the normalized click through rates;
   electronically storing the weighted advertisements on the computer readable medium;
   selecting at least one advertisement based on the weights assigned thereto, where the weights are determined based upon the normalized click through rates; and
   electronically distributing advertisements according to the one or more advertisements' associated weights in response to one or more requests for advertisements.

2. The method of claim 1 comprising:
   generating a tracking code for a given advertisement;
   retrieving user interaction data associated with the given advertisement through use of the tracking code; and
   delivering the user interaction data to a data store as specified by the tracking codes.

3. The method of claim 1 wherein normalizing the click through rates comprises normalizing according to time.

4. The method of claim 1 wherein normalizing the click through rates comprises normalizing according to placement of the advertisement within a ranked list of advertisements.

5. The method of claim 1 wherein normalizing the click through rates comprises normalizing according to user characteristics as specified in a user profile.

6. The method of claim 1 wherein normalizing the click through rates comprises normalizing according to demographic information.

7. The method of claim 1 wherein assigning weights to the one or more advertisements within the group of advertisements comprises selecting an algorithm to compare normalized click through rates of the one or more advertisements within the group of advertisements.

8. The method of claim 7 wherein selecting the algorithm comprises selecting based upon a quantity of advertisements in the group of advertisements.

9. The method of claim 7 wherein selecting the algorithm comprises selecting based upon a quantity of click through data available for the one or more advertisements within the group of advertisements.

10. The method of claim 1 wherein assigning weights to the one or more advertisements within the group of advertisements comprises:
    assigning equal weights to the one or more advertisements within the group of advertisements;
    calculating an average normalized click through rate for the one or more advertisements within the group of advertisements;
    comparing a normalized click through rate for a given advertisement with the average normalized click through rate; and
    updating the weight of the given advertisement based upon the comparison.

11. The method of claim 10 wherein updating comprises decreasing the weight of the given advertisement where the average normalized click through rate exceeds the normalized click through rate for the given advertisement.

12. The method of claim 10 wherein updating comprises increasing the weight of the given advertisement where the normalized click through rate exceeds the average normalized click through rate for the given advertisement.

13. The method of claim 1 wherein assigning weights to the one or more advertisements within the group of advertisements comprises:
    calculating an average normalized click through rate for the one or more advertisements within the group of advertisements;
    comparing a normalized click through rate for a given advertisement with the average normalized click through rate; and
    updating the weight of the given advertisement based upon the comparison.

14. The method of claim 1 wherein assigning weights to the one or more advertisements comprising the group of advertisements comprises
    selecting a first advertisement from the one or advertisements within the group of advertisements;
    selecting a second advertisement from the one or more advertisements within the group of advertisements;
    comparing the normalized click through rate of the first advertisement with the normalized click through rate of the second advertisement; and
    assigning the advertisement with the lesser normalized click through rate a weight of zero.

15. The method of claim 1 wherein distributing advertisements comprises distributing to a website.

16. The method of claim 1 wherein distributing advertisements comprises distributing in response to a user search query.

17. The method of claim 1 wherein distributing advertisements comprises distributing as one or more pop-up advertisements.

18. The method of claim 1 wherein distributing advertisements comprises distributing as one or more banner advertisements.

19. The method of claim 1 wherein distributing advertisements according to the one or more advertisements' associated weights comprises distributing advertisements with the greatest associated weights in response to one or more requests for advertisements.

20. The method of claim 1 wherein distributing advertisements according to the one or more advertisements' associated weights comprises:
    identifying two or more advertisements from a given advertiser within the group of advertisements;
    generating a random number;
    comparing the random number generated with the weights associated with the two or more advertisements from a given advertiser within the group of advertisements; and
    selecting an advertisement from among the two or more advertisements from a given advertiser for distribution based upon the comparison.

21. A system for delivering advertisements, the system comprising:
    a content data store operative to store one or more advertisements as a group of advertisements;
    an analytics data store operative to store click through rates associated with the one or more advertisements stored in the content data store;
    a processor for processing weight optimization operations and normalizing algorithms;
    a weight optimizer processor operative to select a normalizing algorithm from a plurality of normalizing algorithms based on a threshold value, the threshold value comprising a number of advertisements in the group of advertisements and electronically normalize click through rates using the selected normalizing algorithm, the click through rates associated with the one or more advertisements within the group of advertisements and assign weights to the one or more advertisements based upon the normalized click through rates; and
    a search-serving processing component operative to:
        receive one or more requests for advertisements,
        generate tracking codes for tracking user interactions with one or more advertisements,
        select the one or more advertisement based on the weights assigned thereto, where the weights are determined based upon the normalized click through rates; and
        distribute the one or more advertisements and associated tracking codes according to the one or more advertisements' associated weights in response to the one or more requests.

22. The system of claim 21 wherein the analytics data store is operative to receive and store data indicating user interactions with one or more advertisements.

23. The system of claim 21 wherein the weight optimizer is operative to retrieve click through data for one or more advertisements within a group of advertisements from the analytics data store.

24. The system of claim 21 wherein the weight optimizer is operative to select an algorithm to assign weights to the plurality of advertisements within the group of advertisements.

25. The system of claim 24 wherein the weight optimizer is operative to select an algorithm based upon the number of advertisements within the group of advertisements.

26. The system of claim 24 wherein the weight optimizer is operative to select an algorithm based upon the quantity of click through data associated with the one or more advertisements within the group of advertisements.

27. The system of claim 21 wherein the search-serving component is operative to receive one or more requests for advertisements from one or more client devices.

28. The system of claim 21 wherein the tracking codes provide information regarding user interactions with a given advertisement to the analytics data store.

29. The system of claim 21 wherein the search-serving component is operative to traverse a group of advertisements and select advertisements with the greatest associated weights for distribution.

30. The system of claim 21 wherein the search-serving component is operative to:
    traverse a group of advertisements to identify two or more advertisements from a given advertiser within the group;
    generate a random number; compare the random number generated with the weights associated with the two or more advertisements from a given advertiser within the group of advertisements; and
    select an advertisement from among the two or more advertisements from a given advertiser for distribution based upon the comparison with the random number generated.

31. The system of claim 21 wherein the search-serving component is operative to distribute one or more advertisements to a web site.

32. The system of claim 21 wherein the search-serving component is operative to distribute one or more advertisements in response to a request from a client device.

33. The system of claim 21 wherein the search-serving component is operative to distribute one or more advertisements as pop-up advertisements.

34. The system of claim 21 wherein the search-serving component is operative to distribute one or more advertisements as banner advertisements.

* * * * *